W. C. MARSHALL.
Improvement in Apparatus for Cutting up Hogs.
No. 130,515.
Patented Aug. 13, 1872.
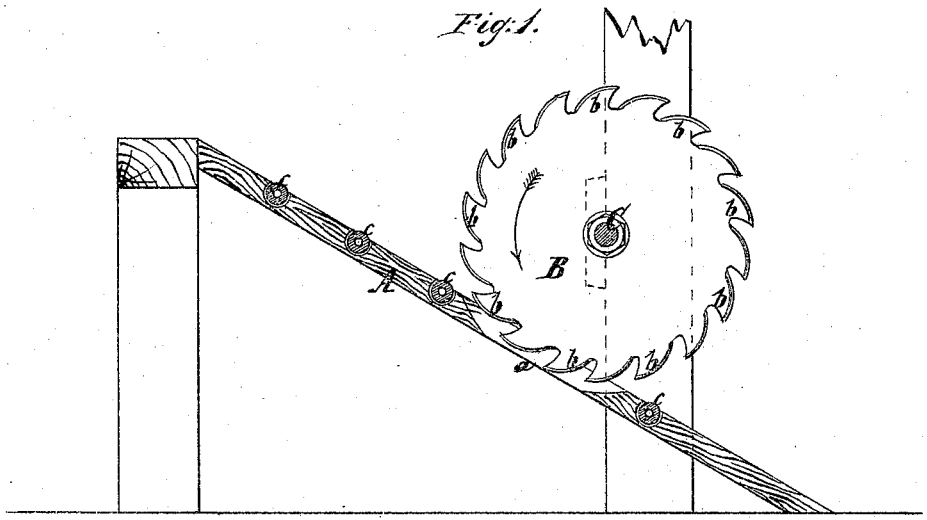
Fig. 1.
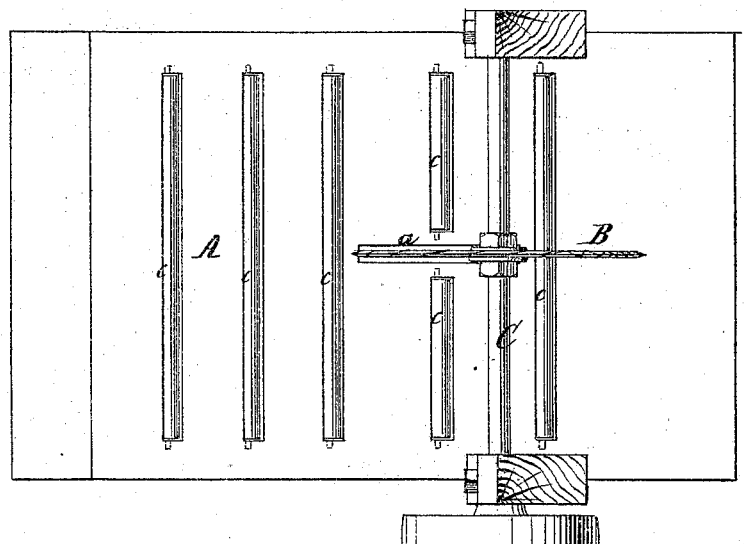
Fig. 2.
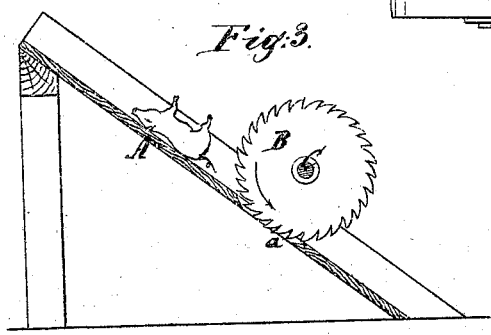
Fig. 3.
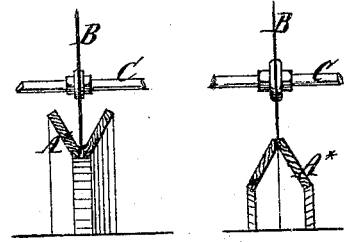
Fig. 4.
Witnesses:
Ernst Bilhuber.
C. Wahlers.
Inventor:
William C. Marshall
Fig. 5.

UNITED STATES PATENT OFFICE.

WILLIAM C. MARSHALL, OF NEW YORK, N. Y.

IMPROVEMENT IN APPARATUS FOR CUTTING UP HOGS.

Specification forming part of Letters Patent No. 130,515, dated August 13, 1872.

*To all to whom it may concern:*

Be it known that I, WILLIAM C. MARSHALL, of the city, county, and State of New York, have invented a new and Improved Apparatus for Cutting Hogs and other Carcasses; and I do hereby declare the following to be a full, clear, and exact description thereof, which will enable those skilled in the art to make and use the same, reference being had to the accompanying drawing forming part of this specification, in which drawing—

Figure 1 represents a longitudinal vertical section of my apparatus. Fig. 2 is a plan or top view of the same. Fig. 3 is a longitudinal section, and Figs. 4 and 5 transverse sections of a modification thereof.

Similar letters indicate corresponding parts.

This invention consists in an inclined feed-table or trough, in combination with a cutter, which resembles in form a circular-saw having its cutting-edges on the backs of the teeth, said cutter being placed over the feed-table, and extending down into or through a recess cut in the same in such a manner that hogs or other carcasses, when placed upon said feed-table, slide down automatically toward the cutter, and, on account of the sectional cutting-edge of said cutter, the hog or other carcass is enabled to feed itself toward the cutter, and the operation of cutting can be effected with dispatch and without interruption. The feed-table may be provided with rollers to facilitate the motion of the hog or other carcass over the same.

In the drawing, the letter A designates a table, which is placed in an inclined position, so that a hog or other carcass placed on it will slide down toward a cutter or knife, B, which is mounted on a spindle, C, situated above the table, and at such distance from the same that the cutting-edge of said knife extends down into or through a recess or mortise, $a$, made in the table to receive the same. The knife B resembles in shape a circular saw, its cutting-edge being made in sections, but the teeth thus formed on the circumference of the knife, instead of being sharpened on their front edges, as in a circular saw, are sharpened on their curved backs $b$, each tooth forming a separate knife; and as the spindle C is rapidly revolved, these separate knives or cutting-edges act on the carcass sliding down over the table A in quick succession, allowing the same, however, to feed itself down toward the knife, so that the operation of cutting is effected with ease and rapidity. In the surface of the table A I have secured rollers $c$ to facilitate the motion of the carcass toward the knife.

For some purposes I have also used a trough, A*, (see Figs. 3 and 4,) in place of the table A, said trough being placed in an inclined position to allow the hogs or other carcasses to slide down therein and to feed themselves automatically toward the cutter. The trough A* may also be reversed, as shown in Fig. 5, in which case the hog or other carcass is made to straddle the same.

What I claim as new, and desire to secure by Letters Patent, is—

An apparatus for cutting hogs or other carcasses, constructed of an inclined feed-table, trough, or reversed trough and a knife, B, with a sectional cutting-edge, substantially in the manner herein shown and described.

W. C. MARSHALL.

Witnesses:
 W. HAUFF,
 E. F. KASTENHUBER.